US006928487B2

(12) United States Patent
Eggebraaten et al.

(10) Patent No.: US 6,928,487 B2
(45) Date of Patent: Aug. 9, 2005

(54) COMPUTER SYSTEM, METHOD, AND BUSINESS METHOD FOR AUTOMATING BUSINESS-TO-BUSINESS COMMUNICATIONS

(75) Inventors: Thomas John Eggebraaten, Rochester, MN (US); Sue Sandra Kelling, Rochester, MN (US); Jeffrey Bernard Nowicki, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 907 days.

(21) Appl. No.: 09/746,372

(22) Filed: Dec. 23, 2000

(65) Prior Publication Data

US 2002/0120776 A1 Aug. 29, 2002

(51) Int. Cl.$^7$ ............................................. G06F 15/16
(52) U.S. Cl. ....................... 709/246; 709/203; 709/206; 709/217; 709/219; 709/232; 707/3; 707/6; 707/102; 707/104; 707/205
(58) Field of Search ................................ 709/203, 206, 709/217, 219, 232, 246; 707/3, 6, 102, 104, 205

(56) References Cited

U.S. PATENT DOCUMENTS

| | | | | |
|---|---|---|---|---|
| 4,831,526 A | * | 5/1989 | Luchs et al. .................... 705/4 |
| 5,596,745 A | * | 1/1997 | Lai et al. ................. 707/103 R |
| 5,675,785 A | * | 10/1997 | Hall et al. .................... 707/102 |
| 5,734,907 A | * | 3/1998 | Jarossay et al. ............. 717/141 |
| 5,873,066 A | * | 2/1999 | Underwood et al. ........... 705/4 |
| 6,073,109 A | * | 6/2000 | Flores et al. .................... 705/8 |
| 6,353,812 B2 | * | 3/2002 | Frankel et al. ................ 705/44 |
| 6,487,469 B1 | * | 11/2002 | Formenti ..................... 700/97 |
| 6,560,611 B1 | * | 5/2003 | Nine et al. ................ 707/104.1 |
| 6,708,189 B1 | * | 3/2004 | Fitzsimons et al. ......... 707/205 |
| 6,751,647 B1 | * | 6/2004 | Srinivasan et al. ......... 709/203 |
| 2002/0181501 A1 | * | 12/2002 | Nova et al. .................. 370/467 |
| 2003/0212904 A1 | * | 11/2003 | Randle et al. .............. 713/200 |

OTHER PUBLICATIONS

"Scaling Up e–business Implementations with WebSphere," AS/400 Edition, an IBM e–business Experience Report, Jan. 5, 2000.

"Extending WebSphere Applications for Business–to–Business Integration," AS/400 Edition, an IBM e–business Experience Report, May 30, 2000.

Jeff Nowicki, "AS/400 e–business integration test, Insurance Company Scenario", slides used in presentation given on Sep. 7, 2000 at the Advanced Solution Conference—European AS/400 Customers Technical Conference in Strasbourg, France.

* cited by examiner

*Primary Examiner*—Nabil El-Hady
(74) *Attorney, Agent, or Firm*—Martin & Associates, LLC (57) ABSTRACT

An apparatus, method, and method for doing business allows two business partners to communicate with each other in an architected manner. A first company monitors for changes to its internal data structure that indicate that communication with a second company may be required. A trigger mechanism monitors the data structure for changes, and invokes a software application when the data structure is changed in a defined manner. The software application extracts the new or changed data from the data structure, formats the data into an XML document, and sends the XML document to the second company via a secure communication mechanism, such as a virtual private network (VPN). The second computer system receives the information from the first computer system, parses the information, and processes the information. The second computer system then generates an appropriate response to the first computer system. In this manner, the first and second computer systems can communicate in an architected manner using XML documents, thereby allowing automation of processes between the two companies.

16 Claims, 8 Drawing Sheets

COMPUTER SYSTEM, METHOD, AND BUSINESS METHOD FOR AUTOMATING BUSINESS-TO-BUSINESS COMMUNICATIONS

BACKGROUND OF THE INVENTION

1. Technical Field

This invention generally relates to computer communications, and more specifically relates to business-to-business computer communications.

2. Background Art

Since the dawn of the computer age, computer systems have evolved into extremely sophisticated devices, and computer systems may be found in many different settings. The widespread proliferation of computers prompted the development of computer networks that allow computers to communicate with each other. With the introduction of the personal computer (PC), computing became accessible to large numbers of people. Networks for personal computers were developed that allow individual users to communicate with each other.

One significant computer network that has recently become very popular is the Internet. The Internet grew out of this proliferation of computers and networks, and has evolved into a sophisticated worldwide network of computer system resources commonly known as the "world-wide-web", or WWW. A user at an individual PC or workstation (referred to as a "web client") that wishes to access the Internet typically does so using a software application known as a web browser. A web browser makes a connection via the Internet to other computers known as web servers, and receives information from the web servers that is rendered to the web client.

With the growing popularity of the Internet, an ever-increasing number of web clients are connected to web servers. This makes it theoretically possible for a business to do business with its business partners electronically, thereby substantially reducing the cost of doing business. Some companies have developed proprietary solutions that include software that allows two businesses to communicate. However, there is currently no architected, standard way for companies to automatically do business with each other. Without a way to automate business-to-business processes in an efficient and cost-effective manner in a standard way, businesses will not be able to fully take advantage of the cost savings that might accrue in automating the communications with their business partners.

DISCLOSURE OF INVENTION

According to the preferred embodiments, an apparatus, method, and method for doing business allow two business partners to communicate with each other in an architected manner. A first company monitors for changes to its internal data structure that indicate that communication with a second company may be required. A trigger mechanism monitors the data structure for changes, and invokes a software application when the data structure is changed in a defined manner. The software application extracts the new or changed data from the data structure, formats the data into an eXtensible Markup Language (XML) document, and sends the XML document to the second company via a secure communication mechanism, such as a virtual private network (VPN). The second computer system receives the information from the first computer system, parses the information, and processes the information. The second computer system then generates an appropriate response to the first computer system. In this manner, the first and second computer systems can communicate in an architected manner using XML documents, thereby allowing automation of processes between the two companies.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The Internet connects millions of computers around the world. The present invention defines an architected manner to communicate between business partners via a secure communication mechanism that may be run on the Internet.

Figure 1:
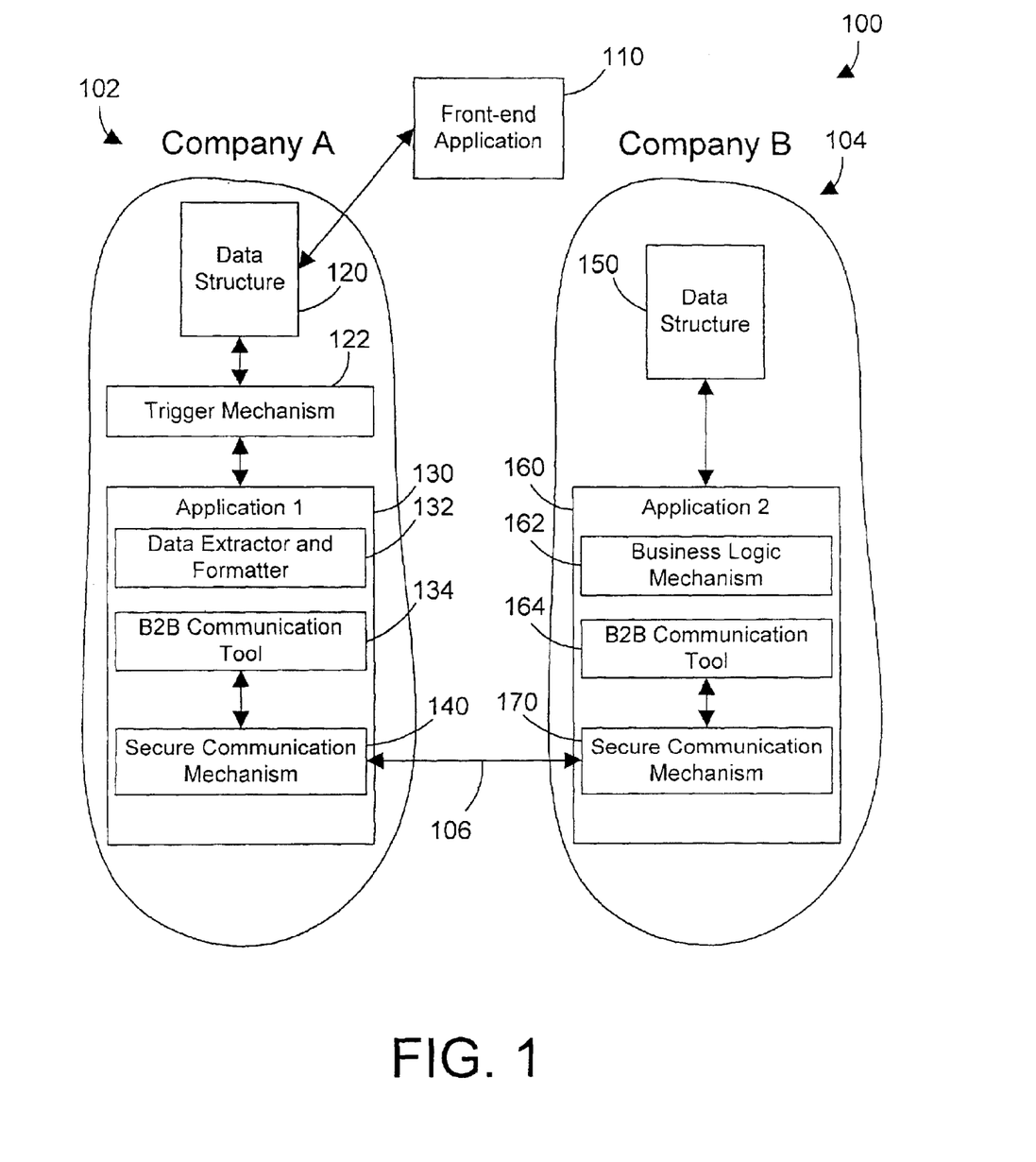
FIG. 1 is a block diagram of a networked computer system that allows automatic interaction between two computer systems in accordance with the preferred embodiments.

Referring to FIG. 1, a networked computer system 100 in accordance with the preferred embodiments includes a first computer system 102 and a second computer system 104 interconnected via a network 106. In the preferred embodiments, network 106 is the Internet.

First computer system 102 corresponds to a computer system for a company we call company A, while second computer system 104 corresponds to a computer system for a company we call company B, which we assume is a business partner of company A. Computer system 102 includes a data structure 120 for storing data. A front-end application 110 is a computer program that interacts with computer system 102. We assume for this example that a user's action via front-end application 110 may result in a change to the data structure 120. A trigger mechanism 122 monitors the data structure for changes. In the preferred embodiments, trigger mechanism 122 includes a trigger signature that defines which activities in the data structure will cause the trigger mechanism 122 to be triggered. One suitable trigger signature is an insert to the data structure, indicating a new entry. When trigger mechanism recognizes an activity in the data structure 120 that matches its trigger signature, the trigger mechanism 122 makes a call to an application 130. Application 130 includes a data extractor and formatter 132 that extracts the new data from the data structure 120 and formats the data into a form that is expected by the second computer system 104. In the preferred embodiments, the expected form is an eXtensible Markup Language (XML) document. XML is a known markup language that allows defining a customized markup language that includes tags and other features defined in a Document Type Definition (DTD) file.

The B2B communication tool 134 includes a defined protocol for interacting with the second computer system 104 in an architected way. One suitable example of a B2B communication tool 134 is the use of HTTP sockets. The formatted data is passed to B2B communication tool 134, which sends this formatted information using a secure communication mechanism 140 to the second computer system 104 via network 106. One suitable example of a secure communication mechanism 140 is a client program for a virtual private network (VPN). VPN software exists that encrypts messages and thus allows messages to be exchanged via the Internet in a secure manner.

The second computer system 104 contains a secure communication mechanism 170 that interacts with the secure communication mechanism 140 in the first computer system 102 to transfer messages between these two computer systems in a secure manner (i.e., in a manner that cannot be readily understood by a party that may monitor the message while it is in transit between the two computer systems). The second computer system 104 includes a B2B communication tool 164 that understands messages that are received from the first computer system 102. Note that B2B communication tool 164 is shown within an application 160 running on the second computer system 104. Application 160 also includes a business logic mechanism 162 that determines the appropriate functions to perform when the information is received from the first computer system 102. When a message is sent from the first computer system's secure communication mechanism 140 to the second computer system's secure communication mechanism 170, the B2B communication tool 164 interprets the message and the application 160 then performs appropriate processing according to the business logic mechanism 162. The second computer system 104 also includes a data structure 150 for storing some or all of the information received from the first computer system 102.

One practical example for the system 100 of FIG. 1 is that company A is an insurance company while company B is the underwriter for the insurance company. A potential client may apply for a new insurance policy using front-end application 110, entering appropriate information, for example, into a form on a web browser. When the form is complete, the user clicks a button to submit the form. The front-end application 110 then stores the information from the form into the data structure 120. The trigger mechanism 122 is programmed with a trigger signature that will detect all insertions into the data structure 120. Thus, when the new information from the form is stored into the data structure 120, the trigger mechanism 122 recognizes this addition of information and invokes application 130.

The application 130 extracts the data from the data structure and formats the data into an appropriate format, such as an XML document. The B2B communication tool 134 then uses the secure communication mechanism 140 to send a message to the secure communication mechanism 170 running on the second computer system 104 via the network 106. The B2B communication tool 164 then interprets the message, and acts on the information in the message according to the contents of the message and the business logic mechanism 162. For our specific example of an insurance underwriter, the business logic mechanism 162 determines the criteria for underwriting a new insurance policy. The new policy information may be saved in the data structure 150. The application 160 will then determine whether the application for a new insurance policy should be granted or denied based on the business logic mechanism 162, and formats and sends a response to the first computer system 102 via the secure communication mechanisms 140 and 170 over network 106. The application 130 running on the first computer system may then provide appropriate feedback to the user. Two suitable ways for application 130 to provide feedback to the user is 1) to provide a message to the user via the front-end application 110, or 2) by sending an e-mail message.

Figure 2:
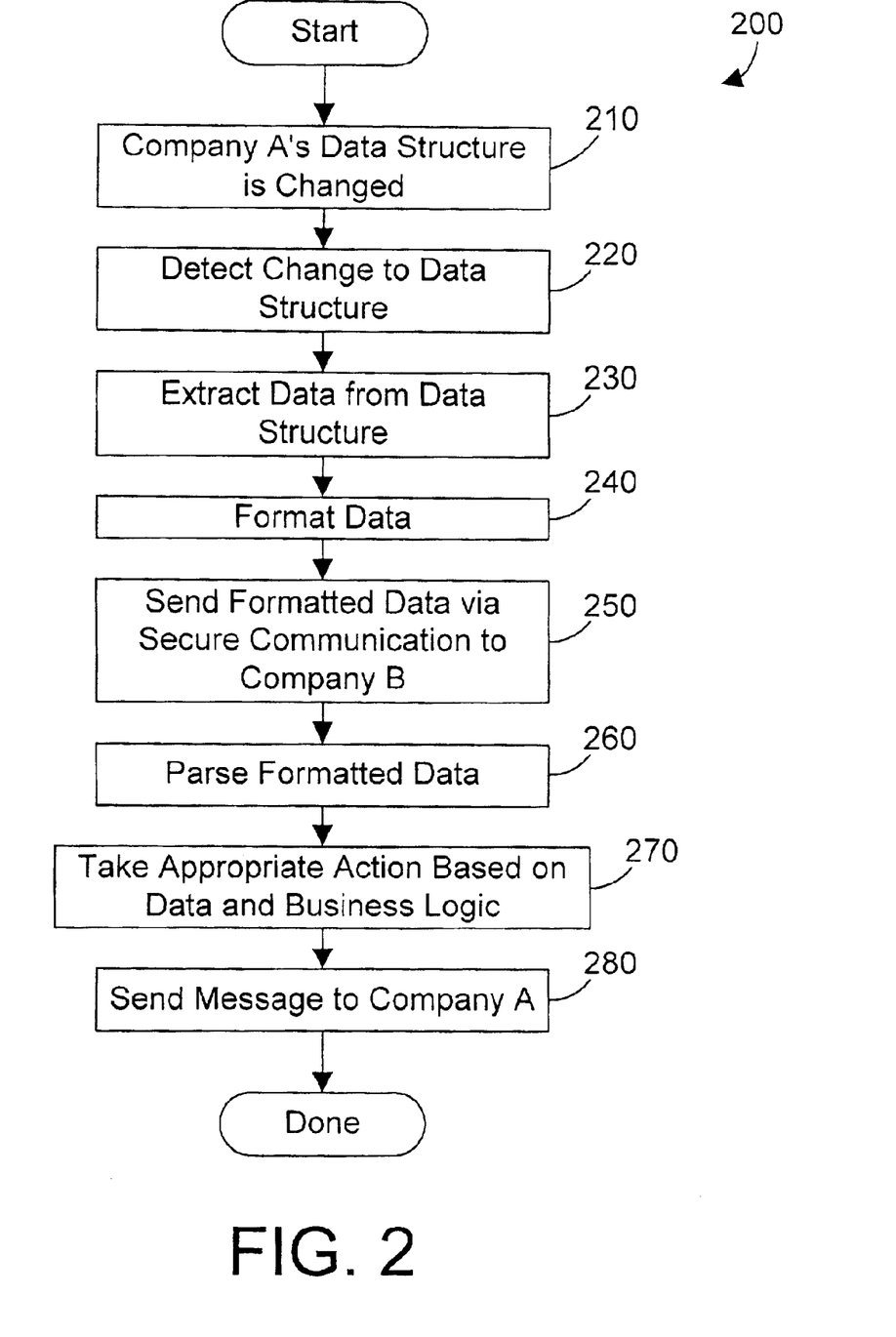
FIG. 2 is a flow diagram showing steps in a method in accordance with the preferred embodiments.

Referring to FIG. 2, a method 200 for communicating between two computer systems begins when company A's data structure 120 (see FIG. 1) is changed (step 210), such as the change of adding new data into the data structure 120. This change in the data structure is detected (step 220), and in response to this detection the pertinent data in the data structure 120 is extracted (step 230), formatted (step 240), and sent via the secure communication mechanism to company B (step 250). Company B then parses the formatted data (step 260), takes appropriate action based on the data and the applicable business logic (step 270), and sends an appropriate response back to company A (step 280).

Figure 3:
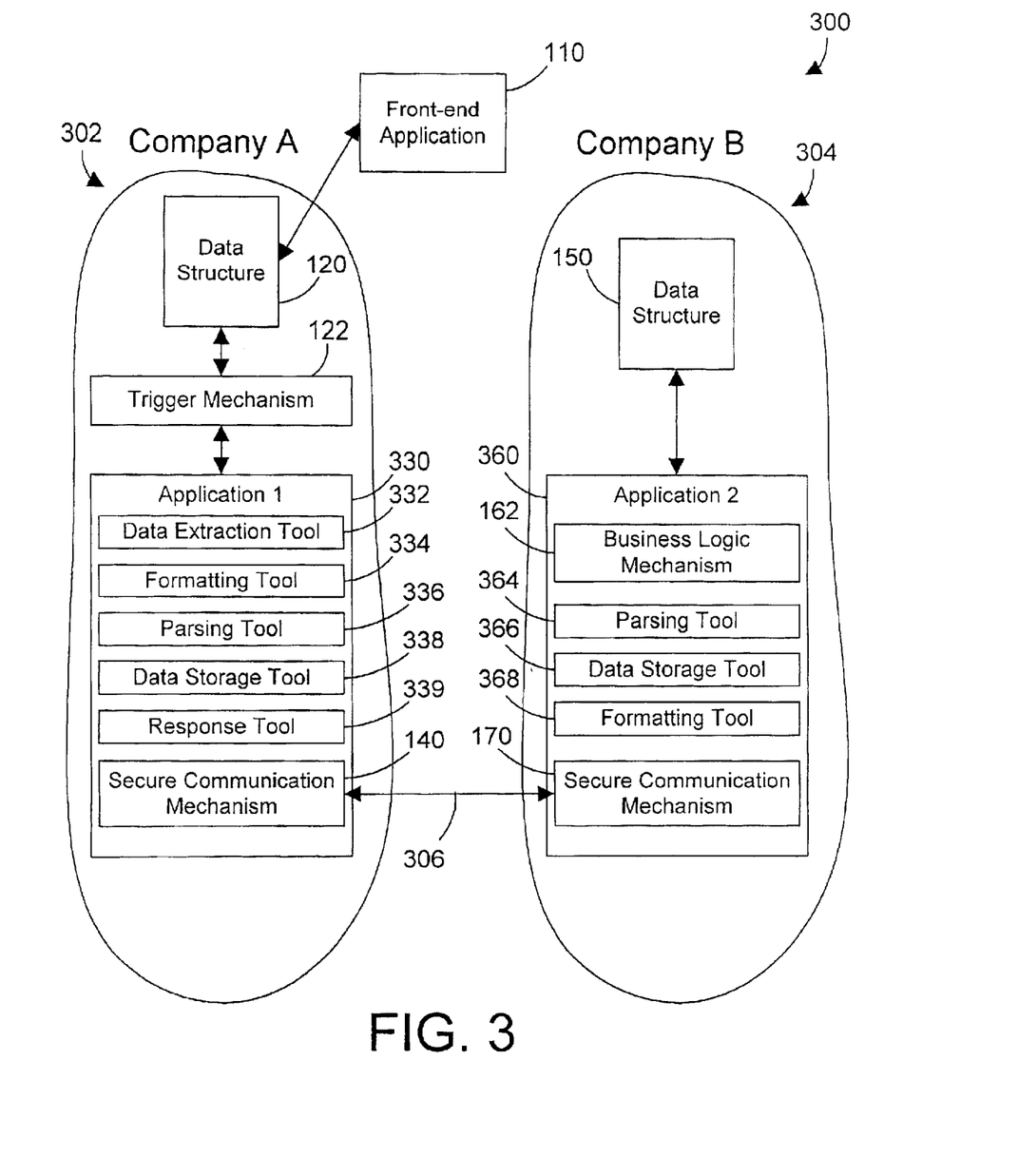
FIG. 3 is a block diagram of a networked computer system in accordance with the preferred embodiments.

Referring now to FIG. 3, a computer system 300 in accordance with the preferred embodiments has computer systems 302 and 304 interconnected by a network 306. Computer systems 302 and 304 include several of the same features shown in FIG. 1, including a front-end application 110, a data structure 120, a trigger mechanism 122, secure communication mechanisms 140 and 170, business logic mechanism 162, and data structure 150. Note, however, that the applications 330 and 360 contain different elements than those shown in FIG. 1. The elements within applications 330 and 360 are intended to indicate functions performed by these applications, and do not necessarily indicate separate programs or portions of code that perform these functions. In other words, application 330 may contain all of the tools 332–339, or may make calls to any other code to accomplish these functions. Likewise, application 360 may perform the functions of business logic mechanism 162 and tools 364–368, or may make calls to any other code to accomplish these functions.

Application 330 in the first computer system 302 of FIG. 3 includes a data extraction tool 332 that extracts data from the data structure 120; a formatting tool 334 that formats the data into a defined format; a secure communication mechanism 140 that sends and receives secure messages between computer systems 302 and 304; a parsing tool 336 for parsing messages received from computer system 304; a data storage tool 338 for storing data received in a message from computer system 304 into the data structure 120; and a response tool 339 that generates an appropriate response to a human user, such as the user that submitted information via front-end application 110.

Application 360 in the second computer system 304 of FIG. 3 includes business logic mechanism 162; a parsing tool 364 for parsing messages received from the first computer system 302; a data storage tool 366 for storing data received in a message from the first computer system 302; a formatting tool 368 that formats information into a defined format; and a secure communication mechanism 170 that allows the exchange of secure messages between the first computer system 302 and the second computer system 304.

As before, business logic mechanism 162 determines how computer system 304 processes messages from the first computer system 302. In our example where Company B is an insurance underwriter, the business logic mechanism 162 would include the criteria for automatically accepting an application for an insurance policy. If the application does not meet the criteria for automatic acceptance, the business logic mechanism may then take appropriate action, such as e-mailing a particular individual with information from the application for manual review, or formatting the information into a web page for viewing by an underwriter.

Figure 4:
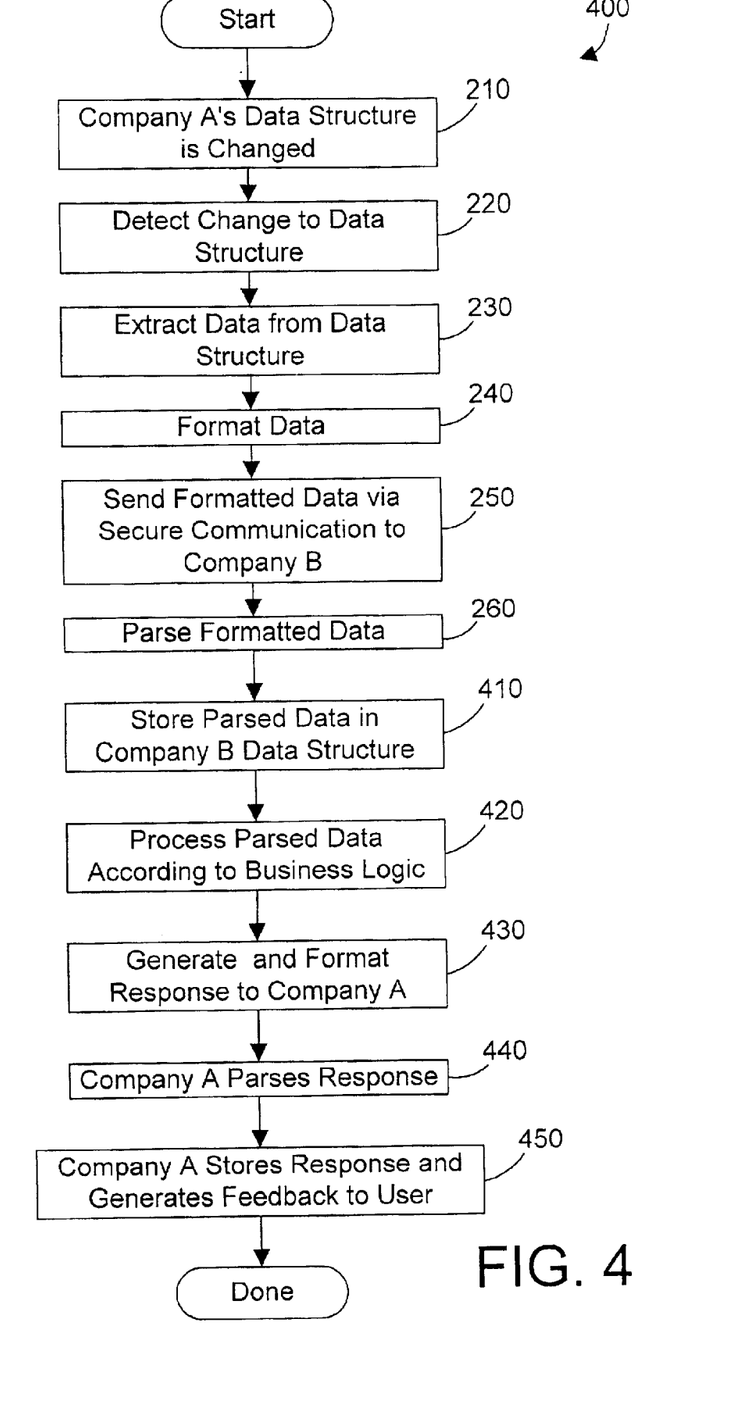
FIG. 4 is a flow diagram showing steps in a method in accordance with the preferred embodiments.

Referring now to FIG. 4, a method 400 in accordance with the preferred embodiments begins when data in the company A's data structure is changed (step 210). This change is automatically detected by the trigger mechanism (step 220). The changed or newly added data is then extracted from the data structure (step 230). This data is then formatted (step 240) and sent to company B via the secure communication mechanism (step 250). Company B then parses the data (step 260), stores the parsed data in company B's data structure (step 410), and processes the parsed data according to the defined business logic (step 420). A response is then generated and sent to company A (step 430). Company A parses the response (step 440), updates the data structure accordingly, and generates appropriate feedback to the user (step 450). Appropriate feedback may be a web page displayed to the user, or an e-mail notification regarding the status of his or her application for insurance.

Figure 5:
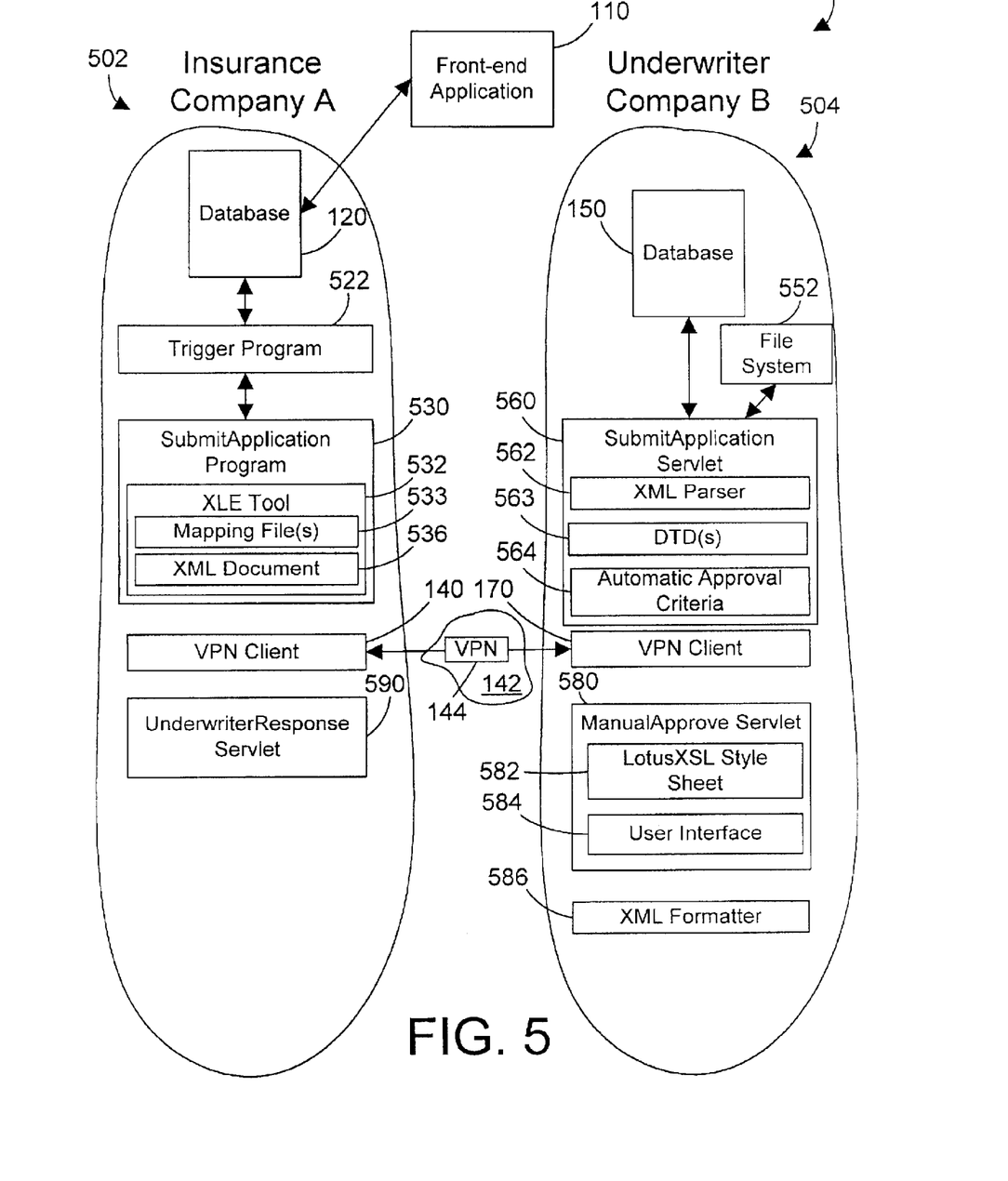
FIG. 5 is a block diagram of a networked computer system in accordance with the preferred embodiments.

Referring now to FIG. 5, a system in accordance with the preferred embodiments includes a first computer system 502 and a second computer system 504 interconnected via a computer network such as the Internet 142. While Internet communications are generally not secure, software that implements a Virtual Private Network (VPN) 144 that encrypts messages before transmission and decrypts messages upon receipt to allow secure communications between computer systems on the Internet. VPN software typically includes client software (such as 140 and 170 in FIG. 5) that must be run on each computer system coupled to the VPN. In addition, VPN may include software (such as 144 in FIG. 5) that runs on one or more servers as well that communicates with the VPN clients 140 and 170.

One suitable type of VPN software in accordance with the preferred embodiments runs on an IBM iSeries 400 computer and uses one of two IPSec protocols to protect data as it flows through the VPN tunnel: Authentication Header (AH) and Encapsulating Security Payload (ESP). The Internet Key Exchange (IKE) protocol, or key management, is another part of IPSec implementation. While IPSec encrypts data, IKE supports automated negotiation of security associations and supports automated generation and refreshing of cryptographic keys.

In addition to the VPN, IP packet security was deployed to secure network communications. IP packet filtering was implemented on the firewalls of the iSeries 400 systems. IP packet filtering protects a computer system by filtering packets according to rules specified on the computer system. A user can thus define policies that determine the type of packets that are permitted or denied access to your system or network.

Another level of security in accordance with the preferred embodiments is to use network address translation (NAT) to hide internal IP addresses of company A's internal servers from becoming public knowledge. Static NAT, which is a one-to-one mapping of IP addresses, was used. NAT was configured on a domain firewall for company A. Static NAT rules were defined to map the internal addresses of company A servers to public IP addresses.

Figure 6A:
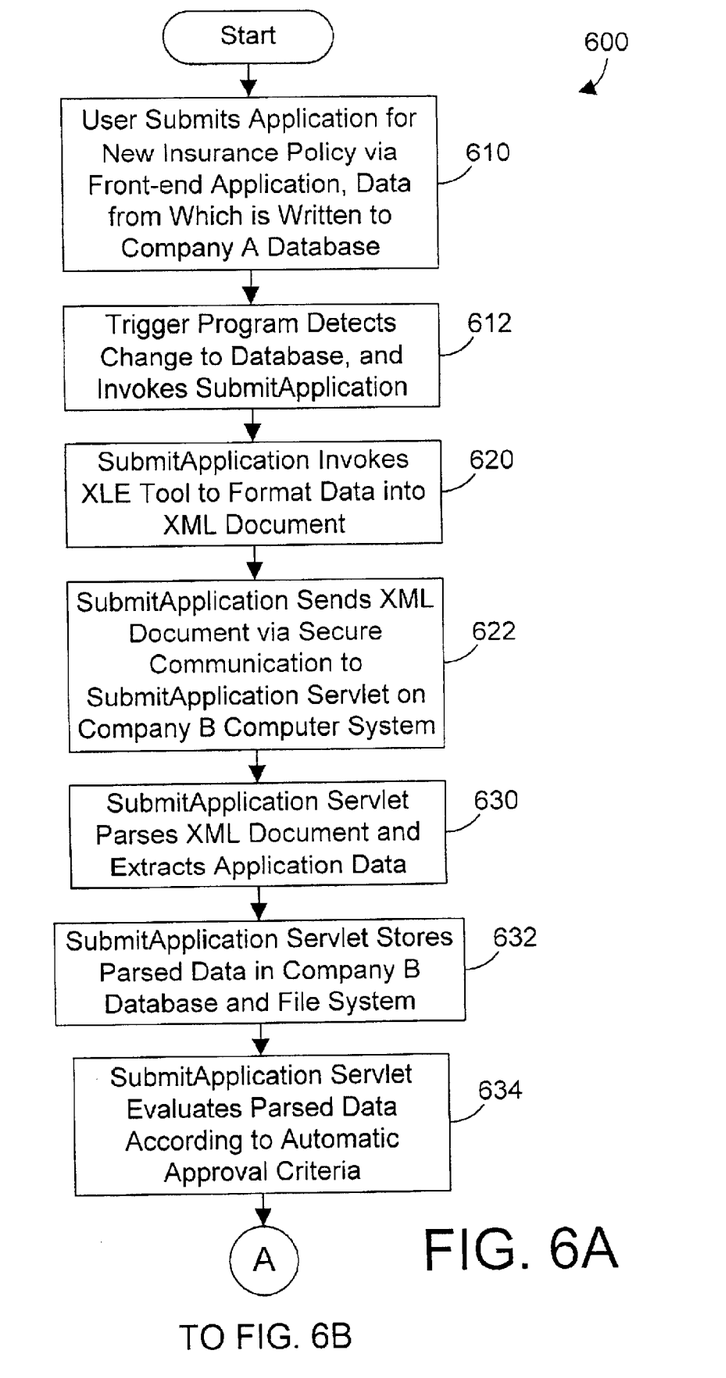
FIGS. 6A and 6B are parts of a flow diagram of a method in accordance with the preferred embodiments for an insurance company to automatically interact with its underwriter.
Figure 6B:
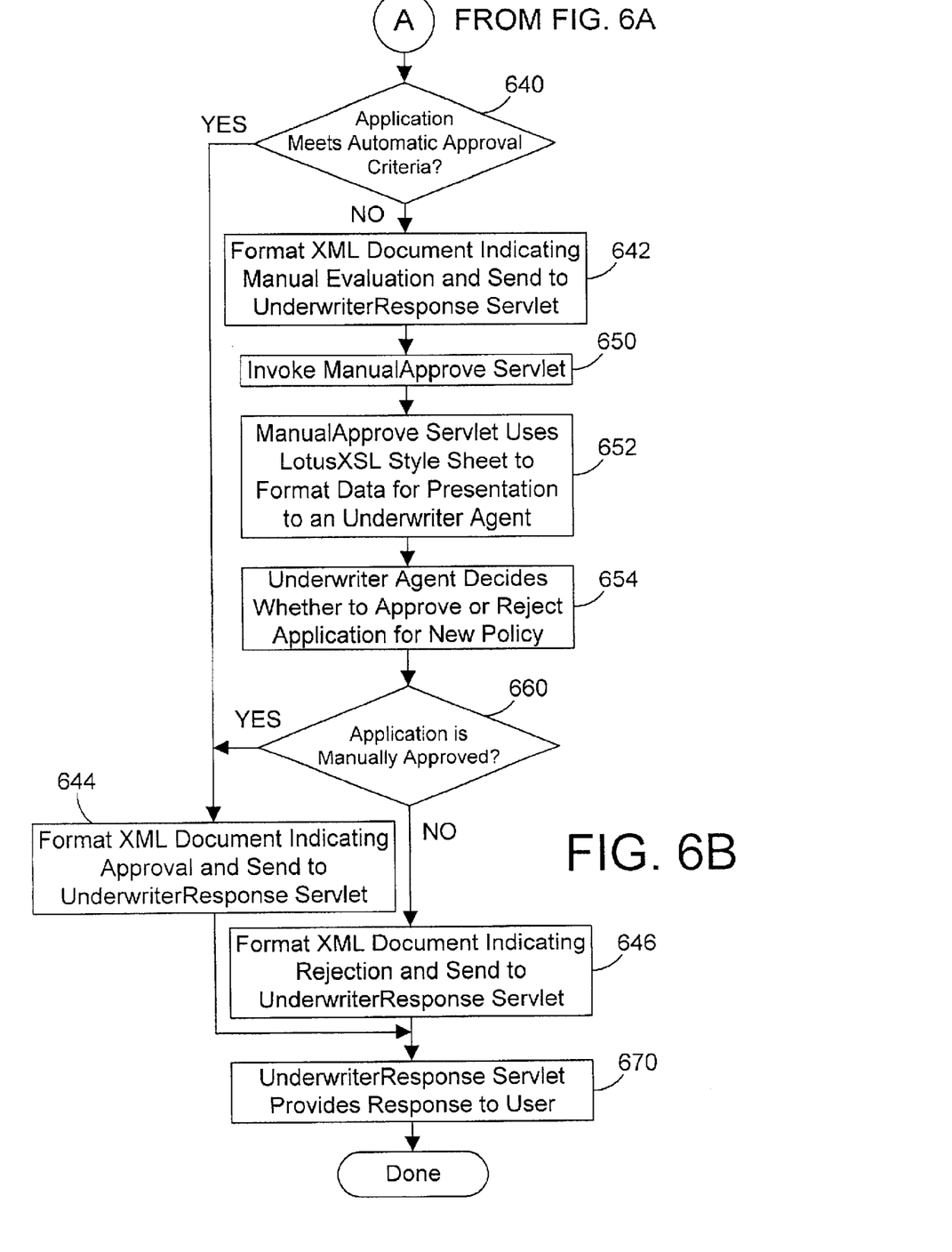

The system 500 of FIG. 5 and the method 600 of FIGS. 6A and 6B represent one specific embodiment directed to an insurance company (company A) doing business with one of its underwriters (company B). We assume that a user may apply for a new insurance policy by filling out a form using front-end application 110. When the form is submitted, data from the form is stored in the database 120 (step 610). A trigger program 522 that is monitoring changes to the database 120 notes the insertion of a new record into the database, and in response invokes the SubmitApplication program 530 (step 612). The SubmitApplication program is a Java application that uses an XLE tool 532 to extract the data from the new record in database 120 and to format the data into an XML document 536 (step 620). Note that the structure and format of the XML document 536 is determined by a mapping file 533 that corresponds to a standard Document Type Definition (DTD) file.

The SubmitApplication program then sends the XML document 536 to the SubmitApplication servlet 170 on company B's computer system 504 via the VPN clients 140 and 170 that are interconnected using the Internet (step 622). In response, the SubmitApplication servlet uses XML parser 562 to parse the XML document and to extract the data for the application for a new insurance policy (step 630). In the preferred embodiments, XML parser 562 is preferably an IBM XML4J parser developed and marketed by the IBM Corporation.

Once the application data has been extracted from the XML document in step 562, the SubmitApplication servlet 560 stores the parsed data in company B's database 150 and file system 552 (step 632). At this point the SubmitApplication servlet 560 evaluates the data and compares it with automatic approval criteria 564 (step 634). If the data meets the automatic approval criteria 564, the application may be automatically accepted without the need for human intervention. If the data does not meet the automatic approval criteria 564, the application may then be reviewed by a human agent of the underwriter. Note also that automatic rejection criteria could also be specified that would allow the underwriter to automatically reject certain applications without the need for human intervention.

Referring now to FIG. 6B, if the application meets the automatic approval criteria (step 640=YES), an XML document is generated to indicate approval and is sent to the UnderwriterResponse servlet 590 in company A's computer system 502 (step 644). If the application does not meet the automatic approval criteria (step 640=NO), an XML document is generated to indicate that manual evaluation of the application is required, and the XML document is sent to the UnderwriterResponse servlet (step 642). The ManualApprove servlet is then invoked (step 650). The ManualApprove servlet 580 uses a LotusXSL style sheet 582 to format the data for presentation to an agent of the underwriter via a user interface 584 (step 652). One suitable way to format the data for presentation in step 652 is to generate a web page that may be viewed using a browser. After reviewing the application data in the user interface 584, the underwriter agent decides whether to approve or reject the application for a new policy (step 654). If the application is manually approved, as indicated by the underwriter agent clicking on an "accept" button (step 660=YES), an XML document indicating approval is generated and sent to the UnderwriterResponse servlet (step 644). If, however, the application is not manually approved (step 660=NO), an XML document indicating rejection is generated and sent to the UnderwriterResponse servlet (step 646). At this point the UnderwriterResponse servlet 590 can provide a response to the user of front-end application 110 (step 670). Examples of suitable responses include a web page that may be displayed in a browser or an e-mail message.

In an effort to standardize information exchange among different computer system, some groups have defined "standard" DTDs for particular applications. For example, the Agency-Company Operations Research and Development (ACORD) has defined XML DTDs that are standardized for use within a particular industry. ACORD currently defines the following DTDs that specifically relate to insurance policies: 1) personal auto insurance request; 2) personal auto insurance response; 3) personal home insurance request; and 4) personal home insurance response. More information regarding ACORD DTDs may be found at http://www.acord.org/standards/xml/Frame.htm. In the preferred embodiments these standard DTDs defined by ACORD may be used, or these DTDs may be modified as required to achieve a DTD that meets the needs of particular business partners. Of course, other DTDs generated from scratch would also be suitable for the preferred embodiments. Any DTD that defines a document format for exchanging information regarding an insurance policy can be used, so long as both companies that want to exchange this information agree to use the same or compatible DTDs. One of the main benefits of using XML is the power that comes from defining documents using DTDs, rather than using fixed architectures defined at a lower level.

Note that the information in the DTDs need to exist on each computer system. In FIG. 5, the mapping files 533 in the first computer system include DTD information (as discussed below), and DTDs 563 in the second computer system 504 contain DTD information that correspond to each mapping file 533. Because each computer system knows the expected format of an XML document, each computer system may validate messages after they are constructed but before they are sent, and may validate messages when they are received for compliance with the DTD specified in the message.

XLE tool 532 is an XML Lightweight Extractor (XLE), such as the XLE utility provided by the IBM AlphaWorks team, which provides leading edge technology tools to the public that may be downloaded for free from the AlphaWorks website at www.alphaworks.ibm.com. XLE allows for easily extracting data out of any database and formatting the results into XML. This is done by creating a mapping file, which tells XLE which database tables and columns to map to which XML tags.

The first computer system 502 transmits the XML document 536 to the second computer system 504 by invoking the main( ) method on the SubmitApplication servlet 560, passing the XML document as a parameter to the call. Several methods that may be invoked on the SubmitApplication( ) program 530 are shown in more detail in FIG. 7, and include: main( ); submitApplication( ); init( ); log( ); generateRequestId( ); validateXmlString( ); sendRequest( ); updateDatabase( ); sendEmail( ); addToPending( ); and readSMTP( ). The main( ) method calls a submitApplication( ) method, which in turn invokes an init( ) method to initialize a log file for error reporting, and reads a properties file for database connection information. A log( ) method takes a string as a parameter and writes the string to the log file that is set up in the init( ) method. The generateRequestId( ) method creates a new unique request identifier based on the application number and current time so that requests for new policies can be tracked easily.

The submitApplication( ) method first queries the database for new policies. For each new policy, it calls an extract( ) method on the XLE tool 532 to create the requested XML document 536 from data retrieved from the database 120. SubmitApplication( ) then calls the validateXmlString( ) method to ensure that XLE tool 532 generated a valid XML document 536. Next, submitApplication tries to call sendRequest( ) to send the requested XML document to the underwriter (company B). If sendRequest( ) fails, the submitApplication( ) method will retry the sendRequest( ) a preset number of times, which may be selected to a suitable value to tune the system's performance.

The sendRequest( ) method opens up an HTTP connection to company B's computer system 504. SendRequest( ) then prints the requested XML document into the body of an HTTP request and sends it. Next, the sendRequest( ) method checks the header of the HTTP response for errors, setting a return code appropriately if any errors exist. If there are no errors, the sendRequest( ) method reads the response XML document from the body of the response and calls the validateXmlString( ) method to ensure the underwriter sent a valid response. Next, sendRequest( ) uses the IBM XML4J parser to extract data from the response XML document and verifies that the request identifier matches the response identifier. Finally, the updateDatabase( ) and sendEmail( ) methods are called, and the addToPending( ) method gets called if the status of the policy is pending, meaning that the underwriter was not able to instantly approve or reject the policy.

The updateDatabase( ) method changes the status of the policy in the database 120. The addToPending( ) method inserts a record into a PENDING table of the database with the request identifier as the primary key. The sendEmail( ) method first queries the database to determine the customer and agent's e-mail addresses; then it opens up a socket to the SMTP server to send a status update e-mail to the customer and agent. The sendEmail( ) method uses the readSMTP( ) method to clear the input stream while writing to the SMTP server.

The XLE tool 532 includes a mapping file 533 for each DTD 563 that is defined for communication between the two computer systems 502 and 504. Another known term for a mapping file for XLE is a DTDSA file, which stands for "data type definition with source annotation". A mapping file is similar to a DTD, but contains additional information to describe where each tag will get its data. This allows XLE to assemble an XML document from a set of relational database tables, such as those in database 120.

Known versions of XLE are designed to map each XML tag to one specific column of one specific table. In other words, the tags that XLE expects to see are unique tags. However, in the standard DTDs provided by ACORD, tag names are reused to describe similar data. For example, a <NAME> tag can be used to describe a company name, an agent's name, or a customer's name, each of which is presumably stored in a different table. In addition, the ACORD DTD tag names reuse the YEAR, MONTH, and DAY. Thus, certain changes were required in the standard DTDs to allow the DTDs to be used with XLE. For example, the date tags in the ACORD DTDs were changed from multiple subtags to single value tags. Thus, the ACORD DTD defines:

```
<DateOfBirth>
    <YEAR>2000</YEAR>
    <MONTH>09</MONTH>
    <DAY>14</DAY>
</DateOfBirth>
```

To be compatible with XLE, the date of birth tag was changed to:

```
<DateOfBirth>1999-09-14</DateOfBirth>
```

In addition, the HouseholdIncome tag was changed from multiple subtags to single value tags. Thus, the ACORD DTD defines:

```
<HouseholdIncome>
    <Amount>50,000</Amount>
</HouseholdIncome>
```

To be compatible with XLE, the HouseholdIncome tag was changed to:

```
<HouseholdIncome>50,000</HouseholdIncome>
```

The DeductibleAmount tag was also changed in like manner. These changes to the DTDs are required to create unique tags across the DTDs that can be mapped to corresponding locations in database 120, to make the DTDs (and corresponding mapping files) compatible with XLE. In addition, only the Addr1 subtag in the CustomerAddress tag and Addr2 subtag in the PostalAddress tag were used. While this was not a change to the ACORD DTD, it is a restriction that is needed because of the XLE limitation of expecting unique tags that can be directly mapped to database entries.

Figure 7:
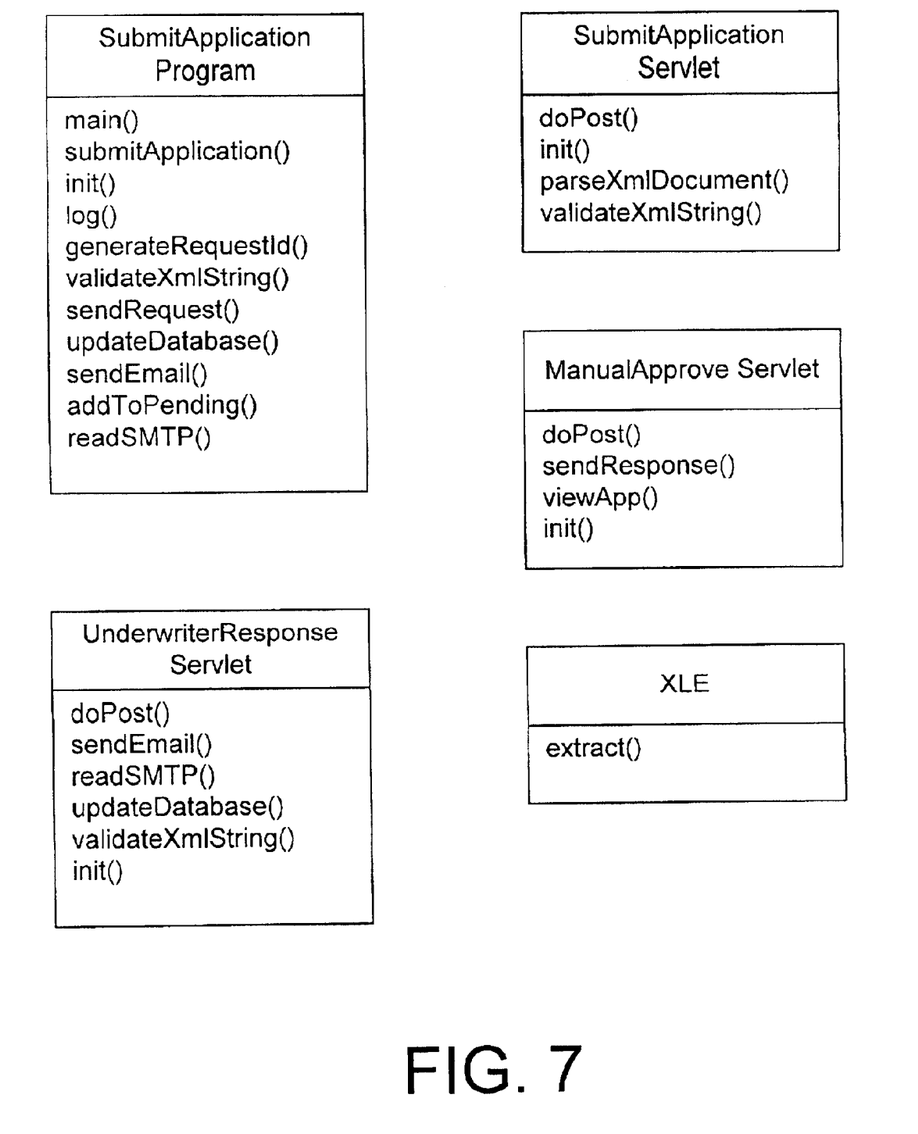
FIG. 7 is a class diagram showing the object methods defined on the programs shown in FIG. 5.

The UnderwriterResponseServlet 590 is similar to the SubmitApplication program, but it is a servlet instead of a Java application, and it processes the response from company B's computer system (but does not send a request to company B). The UnderwriterResponseServlet 590 gets called from company B's ManualApproveServlet 580 whenever a policy application needs to be manually approved or rejected. As shown in FIG. 7, the UnderwriterResponseServlet 590 contains the following methods: doPost( ); sendEmail( ); readSMTP( ); updateDatabase( ); validateXmlString( ); and init( ). As with all servlets, the init( ) method gets called when the servlet first gets invoked. It reads database connection properties from a properties file and sets up a data source object for making connections to the database. The dopost( ) method is invoked each time the UnderwriterResponseServlet gets called, and reads the response XML document from the HTTP request body from computer system B and makes sure the XML document is valid by calling the validateXmlString( ) method. Once validated, the XML4J parser is used to parse out the status information from the XML document. Next, the doPost( ) method queries the PENDING table of the database to verify that the response matches a pending request. Finally, if there are no errors, the doPost( ) method calls both the updateDatabase( ) and sendEmail( ) methods. In the preferred embodiments, the updateDatabase( ), sendEmail( ), and readSMTP( ) methods are the same as the methods described above with respect to the SubmitApplication program.

The SubmitApplication servlet 560 running on company B's computer system 504 processes application requests from company A's SubmitApplication program 530 and sends a response XML document back to company A stating whether the policy was approved, rejected, or pending. As shown in FIG. 7, the SubmitApplication servlet 560 suitably contains the following methods: dopost( ); init( ); parseXmlDocument( ); and validateXmlString( ). The init( ) method sets up the data source object for connecting to the database 150, the same as in the other servlets discussed herein. The doPost( ) method does all the work in this servlet. First, the doPost( ) method reads the requested XML document from the HTTP request body and makes sure it is valid by calling the validateXmlString( ) method. Then, the doPost( ) method calls parseXmlDocument( ), which uses the XML4J parser to extract certain information from the requested XML document, such as the policy number or other data. Next, the dopost( ) method saves the requested XML document as an XML file in a file system 552 on the computer system for company B. This XML file is stored as a file and is later read by the ManualApproveServlet 580 for viewing of the XML file by an agent of the underwriter.

The doPost( ) method then determines whether the policy can be instantly approved or rejected according to automatic approval criteria 564 in FIG. 5. This criteria 564 can be any single criterion or combination of criteria that an insurance underwriter may use as a basis for determining whether to accept or reject an application for a new insurance policy. Let's make a very simplistic assumption and assume for this example that company B is willing to underwrite an insurance policy based on income alone. If a customer's annual income exceeds $50,000, the application for insurance policy may be instantly and automatically approved. If the customer's annual income is less than $10,000, the application for insurance policy may be instantly and automatically rejected. If the customer's annual income is between $10,000 and $50,000, an underwriting agent will need to manually review the application and make a determination whether the application should be rejected or approved. The dopost( ) method determines whether the customer's income is greater than $50,000, and if so, approves the policy; determines whether the customer's income is less than $10,000, and if so, rejects the policy; and determines whether the customer's income is between $10,000 and $50,000, and if so, sets the state of the policy to pending, which requires the underwriting agent to manually review the application by invoking the ManualApproveServlet 580. Finally, the doPost( ) method inserts a record into a database table 150 with the request identifier and status so that the underwriter can easily determine which policy applications have been approved, rejected, or are pending.

The ManualApproveServlet 580 allows the underwriter to view all the pending, approved, or rejected policy applications; to view specific policy details; and to approve or reject policies that have a pending status. As shown in FIG. 7, the methods used in the ManualApprove servlet are doPost( ); sendResponse( ); viewApp( ); and init( ). The init( ) method sets up the data source object for connecting to the database 150. The dopost( ) method first checks the option parameter of the HTML form, which can be set to a view value or a respond value. If the option parameter is set to the view value, the viewApp( ) method is called. If the option parameter is not set to the view value, the doPost( ) method displays some or all of the policy application from the database depending on the value of the option parameter. The underwriter can select which types (approved, rejected, or pending) of policy applications to display or can choose to display all policy applications. The doPost( ) method then displays a table of policy applications to the underwriter with data such as status and customer name and a view button for each application. When the view button that corresponds to an application is clicked, the option parameter is set to the view value and the doPost( ) method calls the viewApp( ) method.

The viewApp( ) method uses LotusXSL style sheets 582 to display the policy application. First, the viewApp( ) method must read the requested XML document that was saved into the file system 552 by the SubmitApplication servlet 560. The viewApp( ) method then reads the LotusXSL style sheet 582, processes the requested XML document, and prints the results to the browser for viewing by a human agent of the underwriter. The sendResponse( ) method is called when the option parameter is set to the respond value, which is done in the LotusXSL style sheet 582 when the underwriter clicks Approve or Reject. SendResponse( ) first reads the status from the HTML form parameters and then formulates the response XML document to send back to company A. The sendResponse( ) method then opens an HTTP connection to company A via the VPN 144. The response XML document is then sent in the body of the HTTP request to company A's UnderwriterResponseServlet 590. If there are no errors in the connection, an APPS table of database 150 that contains new policy applications is updated to reflect the status change of the policy application. Finally, the sendResponse( ) method sends a status message to the user interface 584 informing the underwriter's agent that the operation was successful or that it failed.

The LotusXSL style sheet 582 indicates how to convert the requested XML document into HTML to be sent to a user interface 584 (such as a browser) for viewing by a human underwriting agent. The style sheet works by telling the processor what HTML to print out for each tag of the XML document. In the LotusXSL style sheet 582, all the data of the policy application is preferably formatted into HTML so that the underwriter can easily view the application from a browser and approve or reject the policy. Approve and Reject buttons are displayed on this HTML page, and when either button is clicked, the appropriate parameters, such as the status and the reason for approval or rejection, are passed to the ManualApproveServlet 580, and the sendRequest( ) method on the ManualApproveServlet 580 is then invoked, which causes the response to be sent to the UnderwriterResponse servlet 590.

The drawings herein show specific examples of networked computer systems and computer-implemented methods in accordance with the preferred embodiments. One skilled in the art will appreciate that the computer-implemented methods could also be used as a method for doing business. The preferred embodiments expressly extend to networked computer system, computer-implemented methods, and methods for doing business that are within the scope of the disclosure herein and a reasonable range of equivalents.

The preferred embodiments disclosed herein provide a way for two computer systems to automatically interact with each other using XML documents. By standardizing the communication architecture between businesses in accordance with the preferred embodiments, the implementation of business-to-business communications between business partners will greatly increase the efficiency (and therefore decrease the cost) of doing business between business partners.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. A networked computer system comprising:
   (A) a first computer system comprising:
      a first processor;
      a first memory coupled to the first processor;
      a first data structure residing in the first memory;
      a first application residing in the first memory;
      a trigger mechanism residing in the first memory and executed by the first processor that detects a change to the first data structure and, in response, invokes the first application;
      a software tool residing in the memory that is invoked by the first application to retrieve information from the data structure and to format the information into a defined format comprising an XML document;
   (B) a secure communication mechanism that provides encoded messages between the first computer system and a second computer system, the secure communication mechanism transmitting the formatted information from the first computer system to the second computer system;
   (C) the second computer system comprising:
      a second processor;
      a second memory coupled to the second processor;
      a second data structure residing in the memory;
      a second application residing in the second memory, the second application receiving the formatted information from the secure communication mechanism;
      a parser residing in the second memory, the parser parsing the formatted information and generating therefrom second information, the parser adding the second information to the second data structure;
      the second application processing the second information in the second data structure, taking action based on the second information and business logic for the second computer system, generating a response comprising an XML document to the first computer system, and transmitting the response via the secure communication mechanism.

2. The networked computer system of claim 1 further comprising a front-end application coupled to the first computer system that allows a user to cause a change in the first data structure.

3. A networked computer system comprising:
   (A) a first computer system comprising:
      a first processor;
      a first memory coupled to the first processor;
      a first data structure residing in the first memory;
      a first application residing in the first memory;
      a trigger mechanism residing in the first memory and executed by the first processor that detects a change to the first data structure and, in response, invokes the first application;
      a software tool residing in the memory that is invoked by the first application to retrieve information from the data structure and to format the information into an eXtensible Markup Language (XML) document according to information contained in a mapping file that defines the structure and content of the XML document;
      a response mechanism residing in the first memory and executed by the first processor that processes at least one response from a second computer system;

(B) a front-end application coupled to the first computer system that allows a user to cause a change in the first data structure;

(C) a virtual private network that provides encoded messages between the first computer system and the second computer system, the virtual private network transmitting the XML document from the first computer system to the second computer system;

(D) the second computer system comprising:
  a second processor;
  a second memory coupled to the second processor;
  a second data structure residing in the memory;
  a second application residing in the second memory, the second application receiving the XML document via the virtual private network;
  an XML parser residing in the second memory, the XML parser parsing the formatted information and generating therefrom second information;
  the second application performing the steps of:
    adding the second information to the second data structure;
    processing the second information in the second data structure;
    formatting a response XML document indicating status of processing the second information; and
    transmitting the response XML document to the response mechanism of the first computer system via the virtual private network.

4. A method for communicating and exchanging data between a first computer system and a second computer system, the method comprising the steps of:

(1) detecting a change to a first data structure in the first computer system;

(2) retrieving first information from the first data structure;

(3) formatting the first information into an XML document;

(4) transmitting the formatted first information from the first computer system to the second computer system via a secure communication mechanism that provides encoded messages between the first computer system and the second computer system;

(5) parsing the formatted first information by the second computer system and generating therefrom second information by the second computer system;

(6) acting upon the second information according to business logic residing in the second computer system; and (7) generating a response XML document to the first computer system and transmitting the response XML document via the secure communication mechanism, the response XML document indicates status of the processing of the second information in the second computer system.

5. The method of claim 4 wherein steps (2) and (3) comprise using an XML Lightweight Extractor (XLE) to extract the first information from the first data structure and to format the first information into an XML document that satisfies a mapping file that defines the structure and content of the XML document.

6. The method of claim 4 wherein the business logic includes at least one criterion for automatically processing the formatted first information and at least one criterion for manually processing the formatted first information.

7. The method of claim 4 further comprising the step of:

(8) the first computer system generating feedback to a user that caused the change to the first data structure in step (1).

8. The method of claim 7 wherein step (8) comprises the step of sending a message to the user via the front-end application.

9. The method of claim 7 wherein step (8) comprises the step of sending an e-mail message to the user.

10. A method for communicating and exchanging data between a first computer system and a second computer system, the method comprising the steps of:

(1) a user using a front-end application to cause a change to a first data structure in the first computer system;

(2) detecting the change to the first data structure by the first computer system;

(3) using a XML Lightweight Extractor (XLE) to extract first information from the first data structure and to format the first information into an XML document that satisfies a mapping file that defines the structure and content of the XML document;

(4) transmitting the XML document from the first computer system to the second computer system via a virtual private network that provides encoded messages between the first computer system and the second computer system;

(5) parsing the XML document and generating therefrom second information by the second computer system;

(6) processing the second information by the second computer system;

(8) formatting a response XML document indicating status of processing the second information; and (9) transmitting the response XML document to the first computer system via the virtual private network.

11. The method of claim 10 further comprising the step of:

(10) the first computer system generating feedback to the user.

12. The method of claim 11 wherein step (10) comprises the step of sending a message to the user via the front-end application.

13. The method of claim 11 wherein step (10) comprises the step of sending an e-mail message to the user.

14. A method for doing business by exchanging data between computer systems, the method comprising the steps of:

monitoring for changes in a first data structure in a first computer system;

detecting a change to the first data structure;

in response to the detected change in the first data structure, extracting first information from the first data structure;

formatting the first information into an XML document;

sending the formatted first information to a second computer system for processing via a secure communication mechanism that provides encoded messages between the first computer system and the second computer system;

parsing the formatted first information by the second computer system to generate parsed information;

acting upon the parsed information by the second computer system according to business logic residing in the second computer system; and generating a response XML document to the first computer system that indicates status of the processing of the parsed information, and transmitting the response XML document via the secure communication mechanism.

15. A method for an insurance company that has a first computer system to do business with an insurance underwriter that has a second computer system, the method comprising the steps of:

a trigger program executing on the first computer system monitoring a first database in the first computer system for changes;

the trigger program detecting a change to the first database, the change corresponding to a new application for an insurance policy;

in response to the detected change in the first database, invoking a first software application on the first computer system to extract first information from the first database, the first information corresponding to information in the new application for an insurance policy;

the first software application formatting the first information into an XML document according to information contained in a mapping file that defines the structure and content of the XML document;

the first software application sending the XML document to a second application executing on the second computer system via a virtual private network that provides encoded messages between the first computer system and the second computer system;

the second software application parsing the XML document;

the second software application acting upon information in the parsed XML document according to insurance underwriting logic residing in the second computer system; and the second software application generating a response XML document that indicates whether the new application for the insurance policy is approved and sending the response XML document to the first computer system via the virtual private network.

16. The method for doing business of claim 15 wherein the insurance underwriting logic includes at least one automatic approval criterion, wherein the second software application approves the new application for an insurance policy if the information in the parsed XML document satisfies the at least one automatic approval criterion.

* * * * *

Disclaimer

6,928,487 — Thomas John Eggebraaten, Rochester, MN (US); Sue Sandra Kelling, Rochester, MN (US); and Jeffrey Bernard Nowicki, Oronoco, MN (US). COMPUTER SYSTEM, METHOD, AND BUSINESS METHOD FOR AUTOMATING BUSINESS-TO-BUSINESS COMMUNICATIONS. Patent dated August 9, 2005. Disclaimer filed October 6, 2006, by the assignee, International Business Machines Corporation.

Hereby enters this disclaimer to all of the claims, of said patent.

*(Official Gazette, May 27, 2008)*